(12) United States Patent
Popelka et al.

(10) Patent No.: US 12,328,376 B2
(45) Date of Patent: *Jun. 10, 2025

(54) TECHNIQUES FOR CROSS-PLATFORM COMMUNICATION PROCESS FLOW OBJECT POSTING

(71) Applicant: Salesforce, Inc., San Francisco, CA (US)

(72) Inventors: Aaron Popelka, San Francisco, CA (US); William Robert Jennings, II, Indianapolis, IN (US); Andrew Short, Indianapolis, IN (US); Pranavkumar Janakbhai Parekh, Bothell, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,901

(22) Filed: Feb. 15, 2024

(65) Prior Publication Data

US 2024/0251026 A1 Jul. 25, 2024

Related U.S. Application Data

(63) Continuation of application No. 17/584,985, filed on Jan. 26, 2022, now Pat. No. 11,943,321, which is a continuation-in-part of application No. 17/478,130, filed on Sep. 17, 2021, now Pat. No. 11,757,824.

(51) Int. Cl.
*H04L 67/63* (2022.01)
*H04L 51/56* (2022.01)

(52) U.S. Cl.
CPC ............ *H04L 67/63* (2022.05); *H04L 51/56* (2022.05)

(58) Field of Classification Search
CPC ............................. H04L 67/63; H04L 51/56
See application file for complete search history.

(56) References Cited

U.S. PATENT DOCUMENTS

| | | | | |
|---|---|---|---|---|
| 11,330,024 B2 * | 5/2022 | Sherman | ............... | H04L 69/08 |
| 2014/0108975 A1 * | 4/2014 | Yu | ............... | G06Q 10/10 |
| | | | | 715/764 |
| 2015/0081569 A1 * | 3/2015 | Moore | ............... | H04W 4/21 |
| | | | | 709/204 |
| 2022/0138691 A1 * | 5/2022 | Dickinson | ............... | G06Q 30/0201 |
| | | | | 705/301 |
| 2022/0343250 A1 * | 10/2022 | Tremblay | ............... | G06Q 10/0633 |

* cited by examiner

*Primary Examiner* — Austin J Moreau
(74) *Attorney, Agent, or Firm* — Holland & Hart LLP

(57) ABSTRACT

Techniques described herein are used to support cross-platform data sharing, access, and management between a communication process flow management platform and a communication platform. Specifically, techniques described herein support a communication process flow management platform detecting an event associated with a communication process flow that control electronic communications between a tenant and a set of users. The platform may generate a data object corresponding to the event. The data object may include metadata associated with the event. The platform may transmit, to a communication platform, a request that includes the data object. The request may be configured to cause an entry associated with the event to be posted into the communication platform.

20 Claims, 12 Drawing Sheets

TECHNIQUES FOR CROSS-PLATFORM COMMUNICATION PROCESS FLOW OBJECT POSTING

CROSS-REFERENCE TO RELATED APPLICATIONS

This application is a continuation of U.S. patent application Ser. No. 17/584,985 by Popelka et al., entitled "TECHNIQUES FOR CROSS PLATFORM COMMUNICATION PROCESS FLOW EVENT POSTING" and filed Jan. 26, 2022, which is a continuation-in-part of U.S. patent application Ser. No. 17/478,130 by Popelka et al., entitled "TECHNIQUES FOR CROSS PLATFORM COMMUNICATION PROCESS FLOW EVENT POSTING" and filed Sep. 17, 2021, each of which is assigned to the assignee hereof and incorporated herein by reference in its entirety.

FIELD OF TECHNOLOGY

The present disclosure relates generally to database systems and data processing, and more specifically to techniques for cross-platform communication process flow object posting.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement communication process flow that control communications between a tenant and a set of users (e.g., subscribers). Data analysis systems may analyze the data associated with communication process flows to identify and surface communication metrics (e.g., open rates, click rates). In addition, a communication platform separate from the cloud platform may be used for internal communications related to cloud platform functionality. However, because the communication platform and the cloud platform are implemented in separate computing systems, cross-platform data sharing, data access, and process flow management may be technically challenging, which may result in workflow inefficiencies and limited cross-platform compatibility.

DETAILED DESCRIPTION

Figure 1:
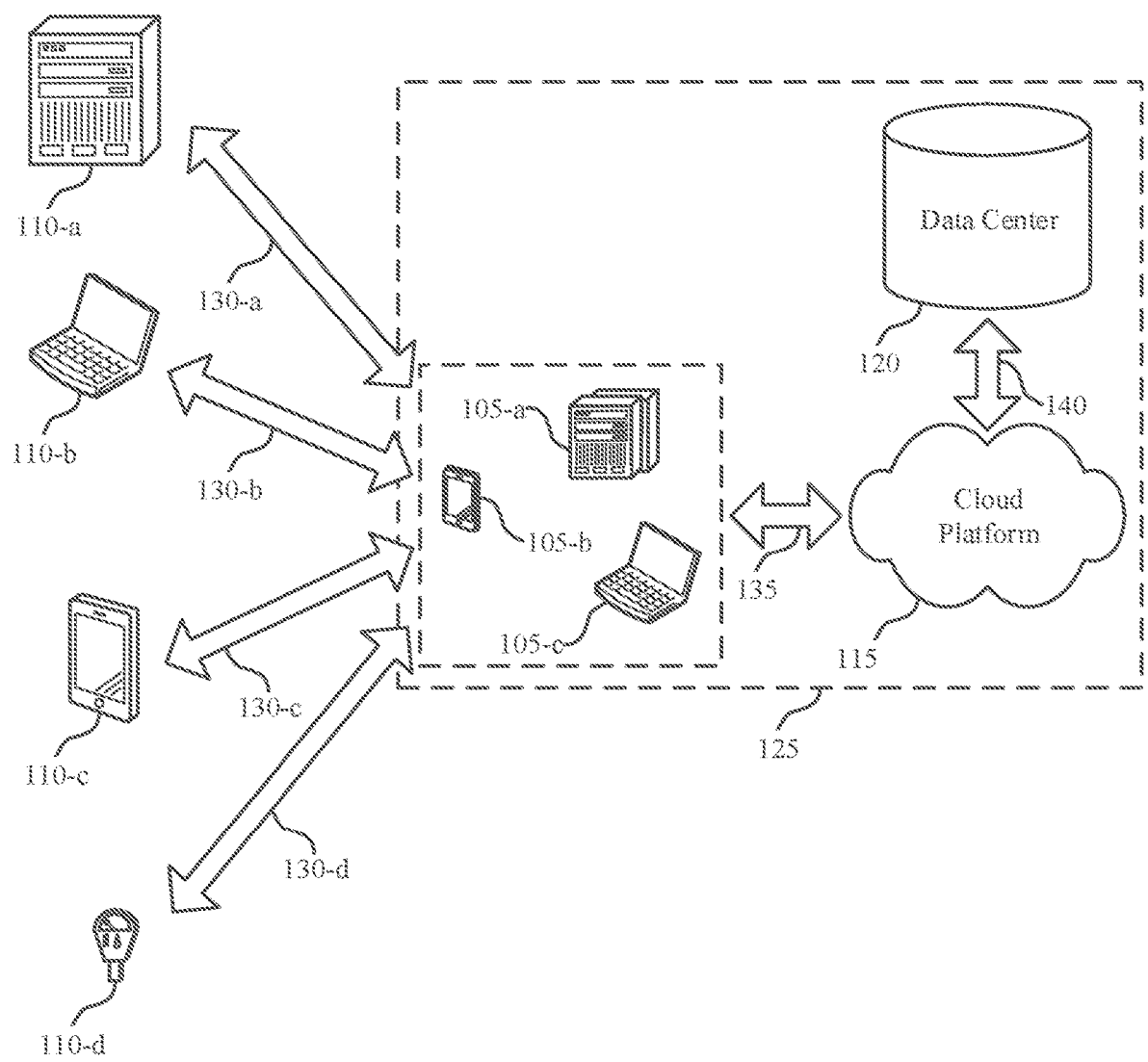
FIG. 1 illustrates an example of a data processing system that supports techniques for cross-platform communication process flow object posting in accordance with aspects of the present disclosure.

Techniques described herein support cross-platform compatibility between a communication process flow management service and a communication platform. A communication process flow management service may support creation, configuration, management, and deployment of a communication process flow that manages communications between a set of users and a tenant or organization. For example, an organization or tenant may use the communication process flow management service to schedule and manage communications between the organization and a set of users, which may be examples of subscribers, customers, or prospective customers of the organization. User's may receive electronic communications (e.g., emails, messages, advertisements) according to a communication process flow. The communication process flow may include various actions and message configurations, and a user's receipt of various communications may be dependent on attribute data associated with the users and user web behavior, among other parameters.

Administrative users or employees associated with the tenant may access various services that monitor communication metrics associated with a communication process flow. For example, some services may provide statistics, such as open rate, click rate, unsubscribe rate, and the like, associated with one or more electronic communications controlled by a communication process flow. These statistics or metrics may be used to manually or automatically tweak aspects of the communication process flow. For example, these metrics may be used to support changing of content items (e.g., subject lines, images) included in an electronic communications, changing of communication frequency or transmission times, and other various communication configurations. The same or other services may also monitor these metrics to detect anomalies associated with the communications. For example, if the service detects that an open rate drops well below an expected open rate, then an alert may be surfaced to one or more administrative users. Thus, various aspects may be used to support communication process flow management and optimization.

In some cases, these administrative users or employees associated with the tenant (e.g., a marketing team) may communicate, plan, and monitor aspects of a communication process flow using an external communication platform. For example, the external communication platform may support communication channels that are organized by topic, and team members may use these channels (e.g., chat room) to perform business communications associated with a communication process flow. However, because the external communication platform is separate from the communication process flow management service, the data associated with the communication process flow (e.g., communication metrics, events, anomalies) is siloed with the computing systems supporting the communication process flow management service. Additionally, the data may support decisions associated with a communication process flow, such as stopping, pausing, or modifying configurations of the process flow. Again, because these decisions may occur within the communication platform that is separate from the communication process flow, a user may be required to access the communication platform management service to activate such changes or actions.

Techniques described herein support cross-platform compatibility between a communication process flow management service and an external communication platform. In some cases, the techniques described herein support posting of various communication metrics, events, objects, and the like occurring in association with a communication process flow into the external communication platform as well as interaction with the communication process flow from the communication platform. These techniques thereby support improved workflow efficiencies as well as reduced communication resource overhead.

Specifically, the techniques described herein may support posting of events or objects associated with a communication process flow into a communication channel of a communication platform that is associated with the tenant. Events associated with the communication process flow that may be posted into the communication platform may include change of a configuration for an action of a communication process flow, a creation of a communication process flow, deletion of an action or the like. In some cases, the events are posted to the communication platform according to a configuration associated with the communication process flow. In some cases, a user may select aspects of a communication process flow object, or portions thereof, and selectively cause posting of metadata associated with the object into the communication platform. Event and object data may be transmitted to the communication platform using a data object and a request to an endpoint at the communication platform. These and other techniques are described in further detail with respect to the figures.

Aspects of the disclosure are initially described in the context of an environment supporting an on-demand database service. Aspects of the disclosure are further described with respect to computing architectures illustrating cross-platform compatibility and process flow diagrams. Aspects of the disclosure are further illustrated by and described with reference to apparatus diagrams, system diagrams, and flowcharts that relate to techniques for cross-platform communication process flow object posting.

FIG. 1 illustrates an example of a system 100 for cloud computing that supports techniques for cross-platform communication process flow object posting in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 and/or subsystem 125 may support a communication process flow management service. The communication process flow management service may be used to configure a communication process flow that manages electronic communications (e.g., emails, messages, advertisements) between a tenant (e.g., client 105) of a multitenant system and a set of users (e.g., contacts 110) associated with the tenant. The communication process flow may include various actions that are used to manage the electronic communications. The actions may include send email, decision splits, wait periods, and the like, and the communication process flow may include multiple routes (or sets of actions) that are configured via the management service. Whether a user receives messages according to various routes may depend on attribute and behavior data associated with the user. Such data may be stored in association with user identifiers at the data center 120.

Communication process flows may be configured by teams of administrators or users associated with the tenant (e.g., employees of the tenant organization). In some cases, various levels of configuration, review, activation, and monitoring may be performed by multiple users using the communication process flow management service. These multiple users may communicate regarding performance and planning associated with a communication process flow via communication platforms that are external from the cloud platform 115 and/or subsystem 125 that supports the communication process flow and the communication process flow management service. For example, the users may communicate via a communication platform that supports chat rooms or channels that may be organized by topic, teams, or the like.

However, because the communication platform is external to the communication process flow management service, limited cross-platform compatibility may exist. For example, data associated with an active communication process flow (e.g., a flow that is managing current and future communications) may only be accessible at the communication process flow management service. Thus, discussion of such data at a communication platform may require a user to manually post the data into the communication platform. Further, such discussion in a communication platform may result in a decision to interact with the communication process flow (e.g., by modifying the communication process flow or activating, pausing, etc. the communication process flow). As such discussion and decisions may occur within the communication platform, the user is required to access the communication process flow management service to modify the communication process flow or interact with the communication process flow. Thus, the separation of data and access between the communication process flow and the communication platform may result in workflow inefficiencies and limited cross-platform compatibility. Additionally, because a user may be required to interact with a communication process flow directly within the communication process flow management service, the communication process flow may utilize significant processing and communication resources by transmitting electronic communications before a user is able to interact with the communication process flow. Real time or near-real time interaction with a communication process flow may reduce wasteful communications.

Techniques described herein may support cross-platform interaction and data access between a communication process flow management service supported by the cloud platform 115 and an external communication platform. In some cases, the communication process flow management service and the cloud platform may be linked for intercommunication and interaction. The communication process flow management service may periodically, or upon satisfaction of some condition, post communication metrics associated with a communication process flow into one or more channels of the communication platform. The communication process flow management service may also post logs, updates, events, or the like associated with the communication process flow into one or more channels of the communication platform. The communication metrics and/or logs may be posted in the form of text, graphs, or a combination thereof. Additionally, a user may interact with the communication process flow management service directly from the communication platform. The interactions with the communication process flow from the communication platform may be performed in response to the posting of the metrics and/or events into the communication platform by the communication process flow management service.

Various events occurring with respect to a communication process flow may be posted to a communication platform using the cross-platform compatibility techniques described herein. Events may include creation events, update events, or delete events occurring with respect to an action of the communication process flow or the communication process flow itself. Upon detection of such events, the communication process flow management platform may generate a data object that includes metadata associated with the event and transmit the data object with a request to the communication platform. The request may cause an entry to be posted into a channel of the communication platform. The entry may include the metadata, such as event type, user that performed or caused the event, among other information. In some cases, the events are posted to the communication platform according to a configuration associated with the communication process flow.

In some cases, a user may selectively cause posting a communication process flow object into the communication platform. For example, a user may select at least a portion of a communication process flow object to cause transmission of a data object to the communication platform to cause posting of an entry into the communication platform. The entry may display metadata associated with the selected object, which may result in discussion of the object in the communication platform. Example objects may include actions or activities, content items (e.g., emails, picture within emails, SMS messages, etc.), events occurring in associated with transmitted communications (e.g., logged open events), behavior objects (e.g., user behavior rules for triggering actions), and other communication process flow objects.

Cross-platform interaction between the communication process flow management service and the communication platform may support improved workflow efficiencies and reduced processing overhead by reducing wasteful communications and data access requests. For example, as the techniques described herein support data associated with a communication process flow being accessible from the communication platform, the techniques may support reduced data access requests at the communication platform. As another example, as the techniques described herein support interaction with a communication process flow directly from the communication platform, the techniques may support reduced use of wasteful communication resources. Additionally, the techniques support reduced overhead associated with switching between various platforms to perform various tasks.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
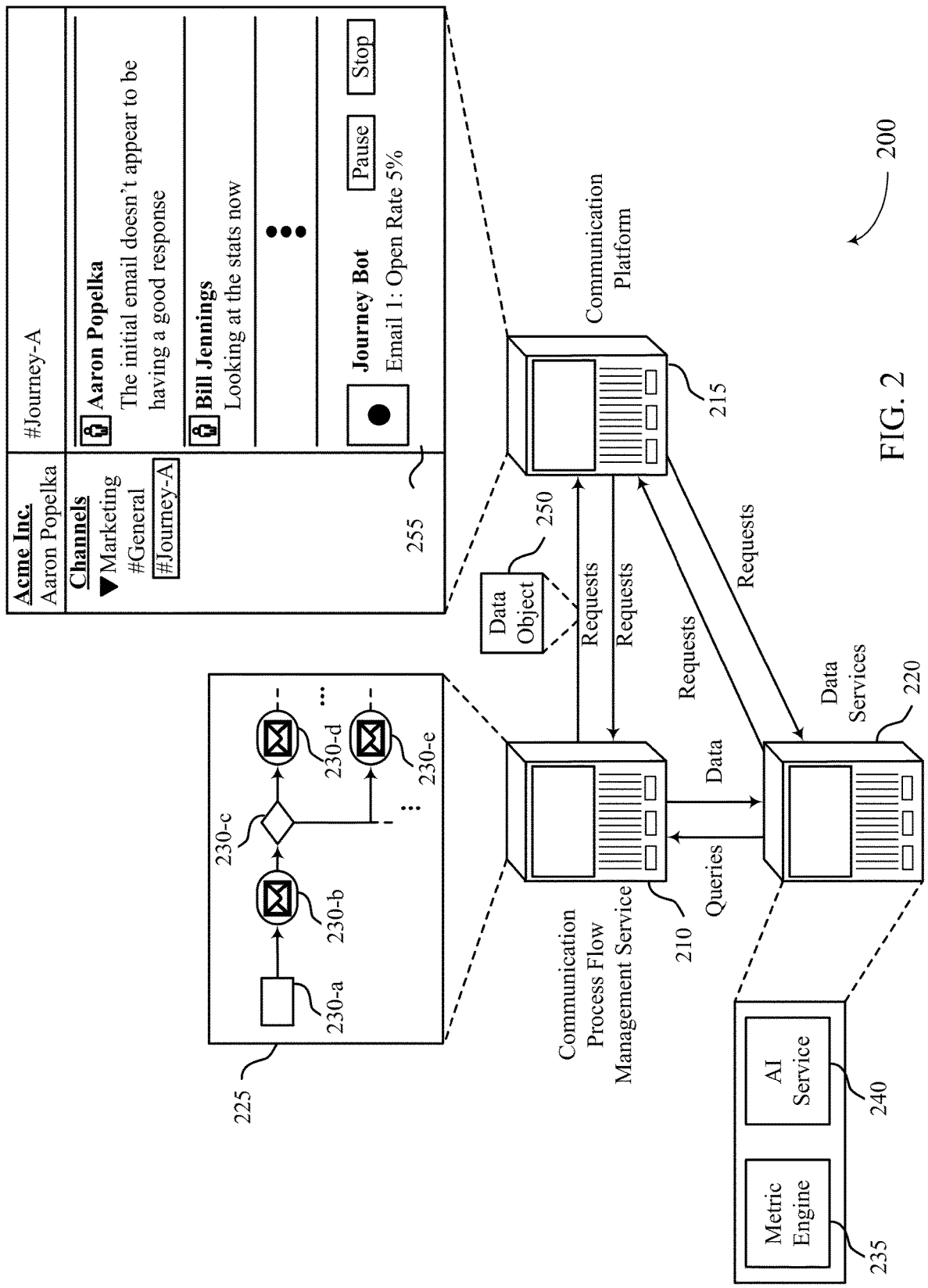
FIG. 2 illustrates an example of a computing architecture that supports techniques for cross-platform communication process flow object posting in accordance with aspects of the present disclosure.

FIG. 2 illustrates an example of a computing architecture 200 that supports techniques for cross-platform communication process flow object posting in accordance with aspects of the present disclosure. The computing architecture 200 includes a communication process flow management service 210, a communication platform 215, and a data services platform 220. Each of the communication process flow management service 210, the communication platform 215, and the data services platform 220 may be implemented in a respective servers. In some cases, the server that supports the communication process flow management service 210 may represent aspects of the cloud platform 115 and subsystem 125 of FIG. 1. The data services platform 220 may also be implemented in aspects of the cloud platform 115 and subsystem 125 of FIG. 1. The systems supporting the communication platform 215 may be a logically or physical separate computing systems from the systems supporting the communication process flow management service 210 and/or data services platform 220.

As described herein, the communication process flow management service 210 may support creation, configuration, and implementation of various communication process flow (e.g., a communication process flow 225) that controls electronic communications between a tenant and a set of users associated with the tenant. For example, users associated with the tenant may use the communication process flow management service 210 to configure actions (e.g., actions 230) that are associated with processor executable instructions for management of electronic communications. For example, action 230-a may be associated with instructions that are used to filter users into the communication process flow 225. That is, action 230-a may define a rule that is used to determine whether a user of a set of users (e.g., associated with a tenant) is to receive electronic communications based on the communication process flow 225. The rule may be based on attribute data and/or web behavior data. For example, users that have purchased a product from the tenant organization in the last six months may receive electronic communications from the tenant based on the communication process flow 225. Users that do not satisfy this rule may not "enter" this example communication process flow 225.

Other actions 230 define message transmissions, decision splits, and other processes. For example, each user that satisfies the rule of action 230-a may receive an email according to action 230-b. The action 230-b may be associated with specific content that is to be emailed to the users. Action 230-c may define a decision split between users. For example, users that opened the email corresponding to action 230-b may be routed to action 230-d, while users that did not open the email corresponding to action 230-b may be routed to action 230-e. Additionally or alternatively, the decision split action 230-c may consider attribute data associated with users, web behavior data (e.g., web page interaction), among other parameters, to route users through the communication process flow 225.

Data services platform 220 may correspond to various services that monitor, aggregate, and display various metrics associated with the communication process flows supported by the communication process flow management service 210. For example, the data services platform 220 may include a metric engine 235 that generates and/or displays engagement metrics, such as open rate, click rate, unsubscribe rate, send rate, and the like associated with one or more electronic communications of the communication process flows supported by the communication process flow management service 210. The engagement metrics may be displayed in charts or graphs. The data services platform 220 may also support an artificial intelligence (AI) service 240 that analyzes communication data associated with the communication process flow supported by the communication process flow management service 210. In some cases, the AI service 240 may identify, using AI technique, anomalies associated with the communications. For example, if a communication metric (e.g., open rate) for communication process flow 225 falls below an expected threshold, then the AI service 240 may surface an alert. The metric engine 235 and the AI service 240 may be implemented as part of the same service (e.g., supported by the same server) or separate/distinct services. The data services platform 220 may transmit queries or requests to a data store associated with or managed by the communication process flow management service 210 to support metrics and anomaly detections. That is, the data services platform 220 may receive communication data from the communication process flow management service 210 to support metric generation and AI services.

The communication platform 215 may represent a chat or instant messaging service that is used to support business function. For example, teams associated with a tenant may use the communication platform 215 to communicate regarding various business functions, including communication process flows supported by the communication process flow management service 210. The teams may use the communication platform to hold a continuous discussion regarding aspects of the communication process flow 225, make decisions regarding the communication process flow 225, and the like. For example, based on data generated by the data services platform 220, the users may decide to reconfigure or interact with the communication process flow 225. However, as described herein, the communication process flow management service 210 and the communication platform 215 are separate platforms, and as such, have limited cross-platform compatibility. Thus, if a decision is made regarding the communication process flow 225 within the communication platform 215, a user may be required to separately access the communication process flow management service 210 to change or interact with the communication process flow 225. Further, the data services platform 220 and the communication platform 215 may be separate systems, and as such, a user may be required to manually input data (e.g., metrics and/or anomalies) regarding the communication process flow 225 into a channel of the communication platform 215 to impact discussions.

Techniques described herein support cross-platform compatibility between the communication process flow management service 210 and the communication platform 215 and the data services platform 220 and the communication platform 215. To support such compatibility, the communication platform 215 may be configured with endpoints (e.g., a webhook or application) that are used by the communication process flow management service 210 and/or the data services platform 220 to transmit request to the communication platform 215. The requests may include data objects (e.g., data object 250) that are ingestible by the communication platform 215 for posting into one or more channels. Thus, the data objects 250 may include data regarding events occurring at the communication process flow management service 210, metrics detected by the metric engine 235, anomalies detected by the AI service 240, and/or data associated with selected communication process flow objects.

Further, the communication platform may be configured to transmit requests to the communication process flow management service 210 and/or the data services platform 220. For example, a user may enter a command or active a user interface (UI) component within the communication platform 215 to request additional data associated with the communication process flow 225 (e.g., refined metrics or additional data associated with the anomaly). In some cases, a user may interact directly with the communication process flow 225 by entering a command or activating a UI component within the communication platform 215. The interaction may include pausing the communication process flow 225 in response to data being posted within the communication platform 215.

To support the cross-platform compatibility, the various services may be configured with endpoints and authorizations. For example, a user may manually enter an endpoint associated with a workspace (e.g., collection of communication channels) or a particular channel at the communication platform into the communication process flow management service 210 and/or the data services platform 220. In some cases, an application may be downloaded to interact with the communication platform 215. The application may include various authentication flows and setup flows to configure the endpoints for the various services. Thus, when setting up the application, the user may log into the account for the communication process flow management service 210 to authenticate the user and to setup the respective endpoints.

After configuring the respective services with the endpoints, the endpoints may be used to transmit requests with data objects to post the data into the communication platform. The entries (e.g., an entry 255) may be posted by a participant to the channel (e.g., a bot that is configured to post into the channel).

As described herein, various events associated with the communication process flow may be relayed to the communication platform 215 for posting into a channel. For example, the communicating process flow management service may monitor changes associated with the communicating process flow 225 and post the changes to the communication platform 215 such that the events are effectively logged. As such, the team members may monitor the changes to the communication process flow 225 without having to access the communication process flow management service to determine changes. In some cases, a configuration at the communication process flow management service indicates whether various changes are to be relayed to the communication platform 215.

Thus, when a change is detected that satisfies the configuration parameters, the communication process flow management service or platform may generate data object 250. The data object 250 may include metadata associated with the change event. For example, the metadata includes the user that implemented the changes, the action 230 that was impacted, a time stamp, or the like. Users of the communication platform 215 may then discuss the changes. In some examples, the data object 250 is configured with a link (e.g., uniform resource locator (URL)) to the communication process flow management service 210. As such, the users of the communication platform 215 may efficiently access the communication process flow management service 210 based on the events.

In some examples, a user may selectively share a communication process flow object associated with the communication process flow to the communication platform 215. For example, a user may highlight a portion of an object, which may trigger activation of a UI component (e.g., a tooltip) that displays a share button. The share button may be clicked to trigger generation of data object 250 that includes metadata associated with the selected communication process flow object such that the metadata is displayed in an entry into the communication platform 215. In some cases, the user may select a channel from the communication platform 215 where the object/entry is to be posted. For example, after selection of the share button on the UI component, a modal may be displayed that prompts the user to select one or more channels for sharing the object. Thus, using these techniques, a user may selectively post objects from the communication process flow management service 210 or the data services platform 220 to the communication platform 215, for further improved communication and cross-platform compatibility.

Figure 3:
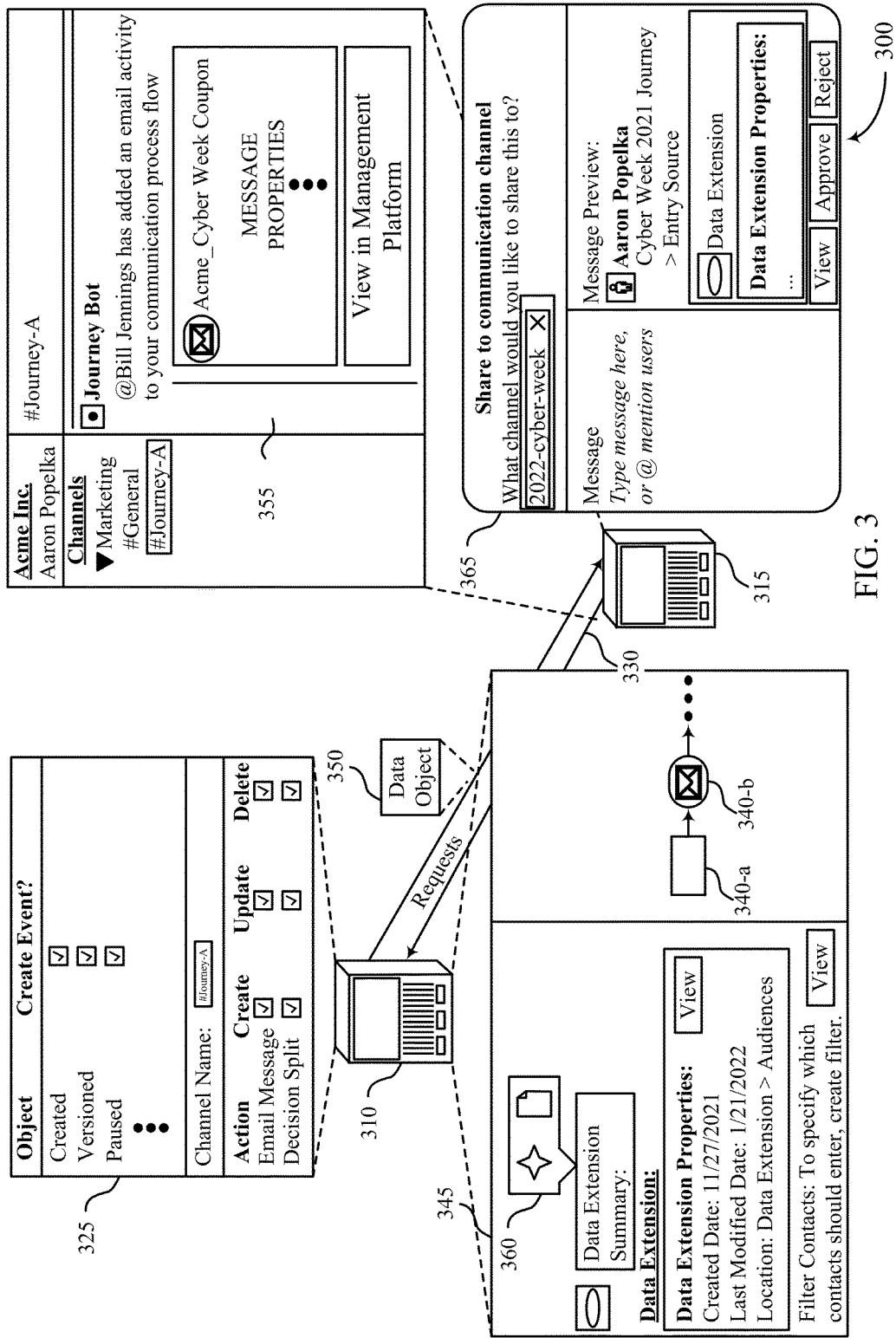
FIG. 3 illustrates an example of a computing architecture that supports techniques for cross-platform communication process flow object posting in accordance with aspects of the present disclosure.

FIG. 3 illustrates an example of a computing architecture 300 that supports techniques for cross-platform communication process flow object posting in accordance with aspects of the present disclosure. The computing architecture 300 includes a communication process flow management service 310 and a communication platform 315, which may be examples of the corresponding systems as described with respect to FIGS. 1 and 2.

As described with respect to FIG. 2, the communication process flow management service 310 supports creation, configuration, and deployment of communication process flows. Additionally, the communication process flow management service 310 and the communication platform 315 are linked for cross-platform compatibility. For example, the communication process flow management service 310 and the communication platform 315 are configured with respective endpoints for communicating with the other systems.

The communication process flow management service 310 supports a configuration page 325 that is used to configure object posting to the communication platform 315. As illustrated in the configuration page 325, the user may select which events are posted by selecting check boxes. Events may be associated with the communication process flow object itself (e.g., created, versioned, paused, activated, stopped) as well as various actions (e.g., actions 230 of FIG. 2) of the communication process flow. Actions may include entry sources, email message, short message service (SMS) message, push message, decision split, wait by attribute, wait by duration, engagement splits, or other types of actions that may be configured for a communication process flow. For each type of action for a communication process flow, the user may selectably activate object posting for creation, updates, and delete events associated with the action. The user may also enter a channel name of the communication platform 315 where the events are to be posted. The channel name may be used as part of the request to the endpoint such that the event is posted in the correct channel.

A user may create, update, or otherwise modify a communication process flow. If object posting is activated, then the communication process flow management service 310 may determine whether the event satisfies the configuration parameters as configured at configuration page 325. If so, then the communication process flow management service 310 may generate a data object 350 and transmit the data object 350 to the communication platform 315 for posting. In some examples, the detection of the event is triggered by a save action at the communication process flow management service 310. A user may be performing various configurations for the communication process flow, such as adding new actions, linking actions, and the like. In some examples, the changes are not final changes. As such, rather than creating an event for each new configuration, the communication process flow management service 310 may wait until the communication process flow is saved. In response, the communication process flow management service 310 may perform a differential operation to determine the updates to the communication process flow and detect the corresponding events/updates.

As described, the communication process flow management service 310 may transmit a request to the communication platform 315. The request may include the data object 350, which may be an example of a JavaScript object notation (JSON) object. The JSON object may include attribute value pairs with indications of the event and information about the event (e.g., user identifier, action type). In some examples, the data object 350 may include content associated with the action or event. For example, if the user adds an email action or updates an email action with new content (e.g., email subject line, images), then the data object may include indications of the content of the email.

As illustrated in FIG. 3, the communication platform posts an entry 355 (e.g., by user "Journey bot") that includes an indication of the action as well as the content associated with the action, which may be identified from the data object 350 included in the request. The entry 355 also includes a UI component (e.g., button) that is associated with a link to the communication process flow management service 310. Thus, a user may activate the UI component to be directed to the communication process flow management service 310, and more specifically, a page associated with the communication process flow where the action or event occurred.

In some examples, the entry may include a UI component that a user may activate to view more details associated with the event. If activated, the communication platform 315 may transmit a request 330 (e.g., for more metadata) to the communication process flow management service 310. In response, the communication process flow management service 310 may generate a new data object 350 with more metadata associated with the event or the impacted action. The new data object 350 may be transmitted to the communication platform 415 in a request and displayed to the user. When the additional data is requested, the additional metadata may be displayed in a new UI in the communication platform 315. For example, the additional metadata may be displayed in a modal UI component.

In some examples, updates to various actions are to be approved by an authorized user. In such cases, the data object 350 may be configured such that the posted entry 355 includes approval buttons that are to be activated by an authorized user. If approved, then the communication platform 315 may transmit the request 330 that includes an approval indication. If rejected, then the communication platform 315 may transmit the request 330 that includes a rejection indication. If rejected, then the communication process flow management service 310 may undo the event associated with the action. In some examples, the communication process flow management service 310 and/or the communication platform 315 may determine that the user that activate the approval or rejection UI component is authorized (e.g., has permissions) to do so before processing the associated action.

As described herein, the user may selectively share objects associated with a communication process flow to the communication platform 315. For example, a user that is configuring or otherwise interacting with a communication process flow at the communication process flow management service 310 may select an object to share it to the communication platform 315. As illustrated in UI 345, a user is viewing a pane associated with a data extension action 340-a, which may be an example of an action that determines whether a user is routed into a communication process flow. The user may highlight (e.g., using a cursor or touch-screen) a portion of aspects of the data extension action object. In FIG. 3, the user highlights the title of the pane "Data Extension Summary," and the highlighting may trigger display of a UI component 360. The UI component 360 may be referred to as a "tooltip" in some cases. The UI component 360 includes buttons for sharing and copying. If the user activates the button for sharing, then data object 350 may be generated to include metadata associated with the data extension action 340-a and transmitted to the communication platform to be posted as an entry, such as entry 355.

In some examples, activation of the share button at the communication process flow management service 310 may cause a modal 365 to be displayed in UI 345, and the modal 365 may include a fields that prompts the user to enter a channel of the communication platform at which the object is to be shared. The modal 365 may also be referred to as a prompt. In some examples, a user may enter a message or user mentions into the modal 365, such that the message is displayed in the communication platform 315 entry and/or such that the users are tagged. Further, the modal 365 may display a message preview that previews the entry into the communication platform 315.

Various types of objects may be shared to the communication platform. Example objects may include user or subscriber objects, activity objects, objects corresponding to a whole communication process flow, objects corresponding to content (e.g., email objects, image objects, text objects) that may be included in messages control by the communication process flow, event objects, etc. A user may highlight just a portion of a displayed aspects of the object to trigger the UI component 360 for sharing to the communication platform 315. In some examples, a share button or UI component may be included with each displayed object for sharing. Thus, a user may not be required to highlight to share. Other sharing triggering techniques are contemplated within the scope of the present disclosure.

Figure 4:
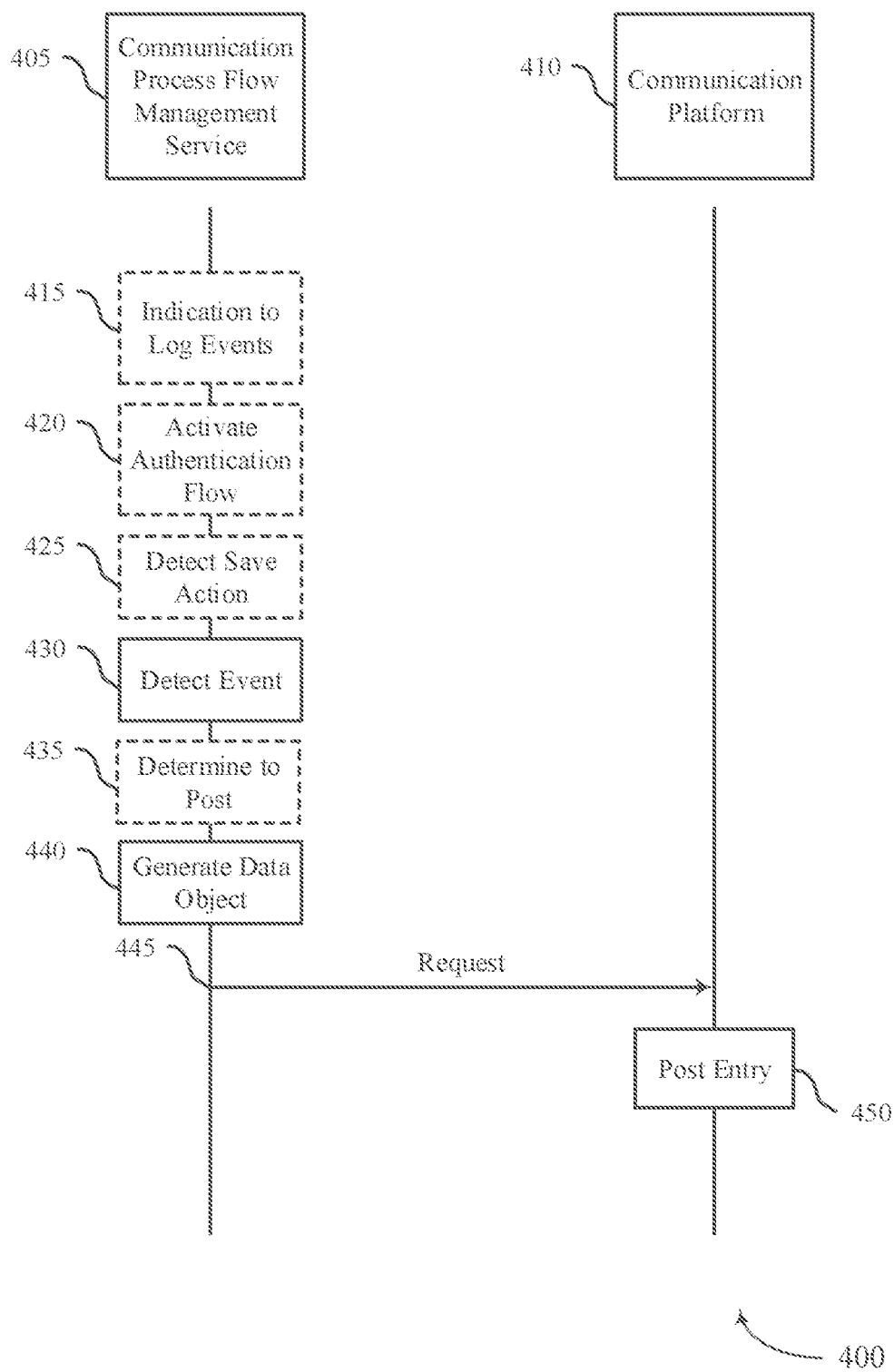
FIG. 4 illustrates an example of a process flow that supports techniques for cross-platform communication process flow object posting in accordance with aspects of the present disclosure.

FIG. 4 illustrates an example of a process flow 400 that supports techniques for cross-platform communication process flow object posting in accordance with aspects of the present disclosure. The process flow 400 includes a communication process flow management service 405 and a communication platform 410, which may be examples of the corresponding systems as described with respect to FIGS. 1 through 3.

At 415, the communication process flow management service 405 may receive an indication of activation of event logging in the communication platform for the communication process flow. For example, a user may activate a UI component to trigger event logging. The activation may be performed before creation of the communication process flow, during configuration of the communication process flow, or after the communication process flow is active. In some cases, activation of the UI component prompts the user to enter a webhook URL for the communication process flow. The webhook URL may link to a workplace (e.g., a set of channels) at the communication platform, a particular channel, or a combination thereof. In some cases, to identify the webhook URL, the user provisions the communication platform 410 with webhook configurations by downloading an application, selecting a menu item, or the like, at the communication platform. The communication platform 410 may be provisioned with the webhook endpoint thereafter, and the user may post the webhook endpoint to the communication process flow management service 405.

In some cases, receiving the indication to activation of event logging includes receiving a request from the communication platform 410 to activate event logging. In such cases, the user may download an application to the communication platform, and the application may be configured to configure the endpoints for cross-platform compatibility between the communication process flow management service 405 and the communication platform 410. For example, during setup of the application, the user may be prompted to authenticate to the communication process flow management service 405, where the user may enter login information. That is, at 420, the communication process flow management service 405 activates an authentication flow for the communication platform. If login is successful, then the communication process flow management service 405 and the communication platform 410 may programmatically configure the endpoints that each system is to use for communication with the other system.

At 425, the communication process flow management service 405 may detect a save action corresponding to the communication process flow. The communication process flow management service 405 may perform a differential operation to detect an event associated with the communication process flow. The differential operation may compare a saved communication process flow to a last version of the communication process flow to detect changed aspects of the communication process flow.

At 430, the communication process flow management service 405 may detect an event associated with the communication process flow that controls electronic communications between a tenant of a multitenant system and a set of users corresponding to the tenant. As described herein, the event may be detected after detecting a save action and performing a differential operation. The event may be a create event (e.g., creation of a communication process flow or creation of new action), an update event (e.g., change action configurations or update the communication process flow), or a delete event (e.g., deletion of an action) associated with a plurality of action types of the communication process flow. In some cases, the communication process flow management service 405 may detect the event based on a user selectively sharing an object. For example, the communication process flow management service 405 may detect, from a user, an indication of selection of a communication process flow object associated with the communication process flow. Detection of the event may include receiving, at the communication process flow management service 405, an indication to share a communication process flow object associated with the communication process flow to the communication platform. Receiving the indication to share may include receiving an indication of activation of UI component (e.g., a button in a tooltip) displayed in association with the communication process flow object. In some cases, the communication process flow management service may cause based at least in part on detecting the event, display of a prompt (e.g., a prompt in a modal) associated with the communication platform.

At 435, the communication process flow management service 405 may determine based at least in part on detecting the event, that the event is configured to be posted in the communication channel in accordance with one or more configuration parameters associated with the communication process flow. In some cases, the determination may include determining that the event corresponds to an action of the communication process flow that is enabled for posting into the communication channel in accordance with the one or more configuration parameters. The one or more configuration parameters may include an indication of a channel name of the communication channel. The one or more configuration parameters may indicate whether a create event, an update event, or a delete event associated with a plurality of action types of the communication process flow are configured to be posted into the communication channel.

At 440, the communication process flow management service 405 may generate, based at least in part on detecting the event, a data object corresponding to the event and that includes metadata associated with the event. The data object may be an example of a JSON object that is ingestible by the communication platform for posting the entry associated with the event into the communication channel. The metadata may include a user that caused the event, event type, timestamp, changed configurations, or the like. The data object may also include a link (URL) to the configuration page to the communication process flow management service 405.

At 445, the communication process flow management service 405 may transmit to the communication platform 410, a request that includes the data object. The request may be configured to cause posting of an entry associated with the event into a communication channel of the communication platform that is associated with the tenant. The request may be transmitted via a webhook endpoint of the communication platform 410.

At 450, the communication platform 410 may post the entry into the channel. The entry may display the metadata included in the data object. In some examples, the entry may include a button or UI component that links (e.g., via the URL included in the data object) to the communication process flow management service 405. In some examples, the entry may include a button or UI component that may be activated to view additional details. In such cases, if the user clicks the UI component, then the communication platform 410 may generate and transmit, and the communication process flow management service 405 may receive, a request for additional metadata associated with the event. In response, the communication process flow management service 405 may generate a second data object and transmit a second request to the communication platform 410. The second request may cause a user component (modal window) to display the additional metadata.

Figure 5:
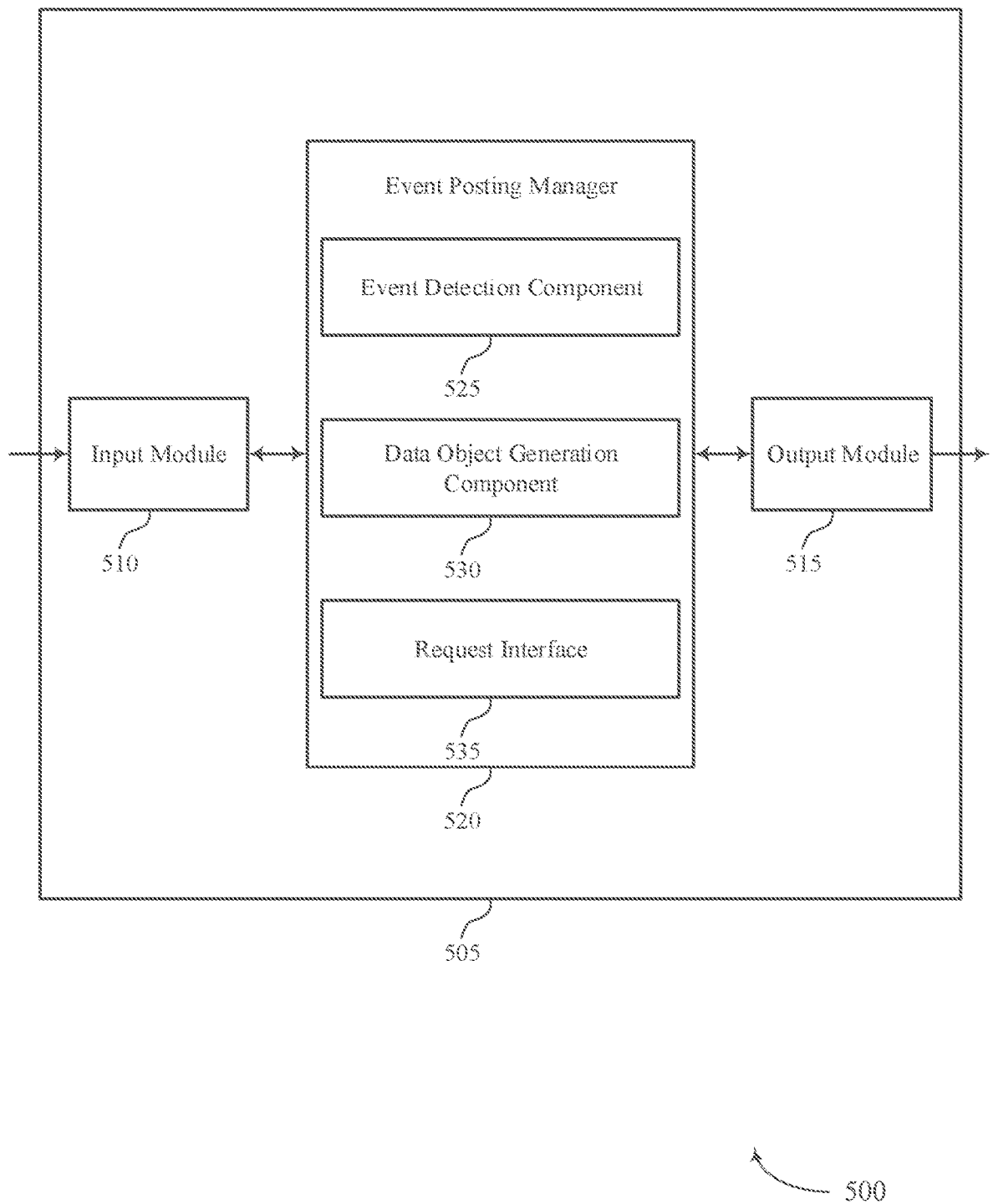
FIG. 5 shows a block diagram of an apparatus that supports techniques for cross-platform communication process flow object posting in accordance with aspects of the present disclosure.

FIG. 5 shows a block diagram 500 of a device 505 that supports techniques for cross-platform communication process flow object posting in accordance with aspects of the present disclosure. The device 505 may include an input module 510, an output module 515, and an object posting manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the object posting manager 520 to support techniques for cross-platform communication process flow object posting. In some cases, the input module 510 may be a component of an I/O controller 710 as described with reference to FIG. 7.

The output module 515 may manage output signals for the device 505. For example, the output module 515 may receive signals from other components of the device 505, such as the object posting manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the object posting manager 520 may include an event detection component 525, a data object generation component 530, a request interface 535, or any combination thereof. In some examples, the object posting manager 520, or various components thereof, may be configured to perform various operations (e.g., receiving, monitoring, transmitting) using or otherwise in cooperation with the input module 510, the output module 515, or both. For example, the object posting manager 520 may receive information from the input module 510, send information to the output module 515, or be integrated in combination with the input module 510, the output module 515, or both to receive information, transmit information, or perform various other operations as described herein.

The object posting manager 520 may support data processing in accordance with examples as disclosed herein. The event detection component 525 may be configured as or otherwise support a means for detecting an event associated with a communication process flow that controls electronic communications between a tenant of a multitenant system and a set of users corresponding to the tenant. The data object generation component 530 may be configured as or otherwise support a means for generating, based at least in part on detecting the event, a data object corresponding to the event and that includes metadata associated with the event. The request interface 535 may be configured as or otherwise support a means for transmitting, from a communication process flow management service and to a communication platform, a request that includes the data object, wherein the request is configured to cause posting of an entry associated with the event into a communication channel of the communication platform that is associated with the tenant.

Figure 6:
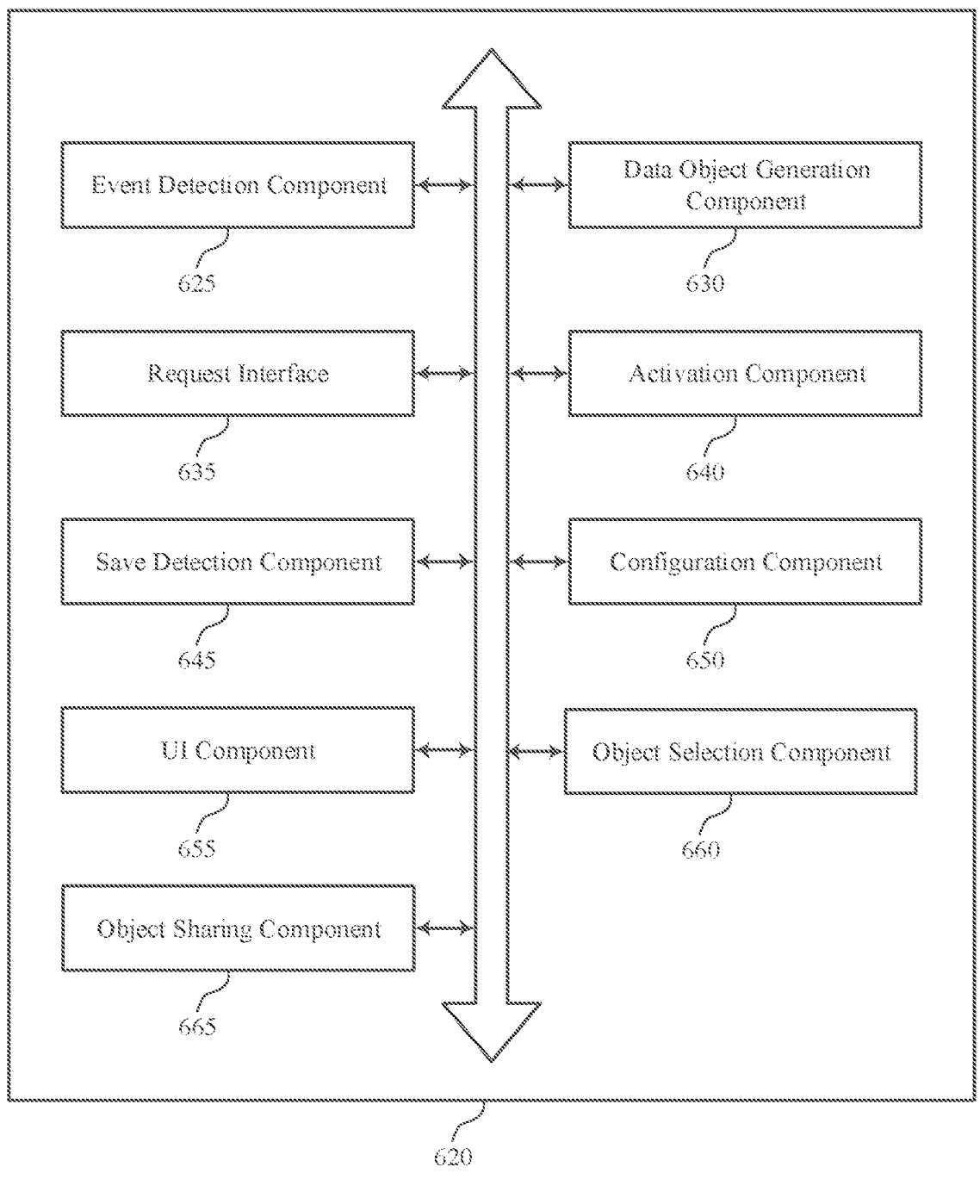
FIG. 6 shows a block diagram of an object posting manager that supports techniques for cross-platform communication process flow object posting in accordance with aspects of the present disclosure.

FIG. 6 shows a block diagram 600 of an object posting manager 620 that supports techniques for cross-platform communication process flow object posting in accordance with aspects of the present disclosure. The object posting manager 620 may be an example of aspects of an object posting manager or an object posting manager 520, or both, as described herein. The object posting manager 620, or various components thereof, may be an example of means for performing various aspects of techniques for cross-platform communication process flow object posting as described herein. For example, the object posting manager 620 may include an event detection component 625, a data object generation component 630, a request interface 635, an activation component 640, a save detection component 645, a configuration component 650, a UI component 655, an object selection component 660, an object sharing component 665, or any combination thereof. Each of these components may communicate, directly or indirectly, with one another (e.g., via one or more buses).

The object posting manager 620 may support data processing in accordance with examples as disclosed herein. The event detection component 625 may be configured as or otherwise support a means for detecting an event associated with a communication process flow that controls electronic communications between a tenant of a multitenant system and a set of users corresponding to the tenant. The data object generation component 630 may be configured as or otherwise support a means for generating, based at least in part on detecting the event, a data object corresponding to the event and that includes metadata associated with the event. The request interface 635 may be configured as or otherwise support a means for transmitting, from a communication process flow management service and to a communication platform, a request that includes the data object, wherein the request is configured to cause posting of an entry associated with the event into a communication channel of the communication platform that is associated with the tenant.

In some examples, the activation component 640 may be configured as or otherwise support a means for receiving an indication of activation of event logging in the communication platform for the communication process flow, wherein the request is transmitted based at least in part on the indication of activation.

In some examples, to support receiving the indication, the activation component 640 may be configured as or otherwise support a means for receiving the indication of a uniform resource locator for a webhook associated with the communication channel, a workspace in the communication platform, or a combination thereof.

In some examples, the activation component 640 may be configured as or otherwise support a means for activating an authentication flow for the communication platform. In some examples, the activation component 640 may be configured as or otherwise support a means for receiving an indication of a uniform resource locator for a webhook that is associated with the communication channel, a workspace in the communication platform, or a combination thereof via the authentication flow.

In some examples, to support generating the data object, the data object generation component 630 may be configured as or otherwise support a means for generating a JavaScript object notation (JSON) object that is ingestible by the communication platform for posting the entry associated with the event into the communication channel.

In some examples, the JSON object includes attribute value pairs corresponding to the metadata associated with the event.

In some examples, to support generating the data object, the data object generation component 630 may be configured as or otherwise support a means for generating the data object that includes an indication of a link to the communication process flow management service.

In some examples, the request interface 635 may be configured as or otherwise support a means for receiving, at the communication process flow management service and from the communication platform in response to transmitting the data object, a second request to view a user interface associated with the occurrence of the anomaly. In some examples, the UI component 655 may be configured as or otherwise support a means for displaying, based at least in part on receiving the second request, the user interface associated with the detected event.

In some examples, the save detection component 645 may be configured as or otherwise support a means for detecting a save action corresponding to the communication process flow. In some examples, the event detection component 625 may be configured as or otherwise support a means for performing, based at least in part on detecting save operation, a differential operation to detect the event.

In some examples, the configuration component 650 may be configured as or otherwise support a means for determining, based at least in part on detecting the event, that the event is configured to be posted in the communication channel in accordance with one or more configuration parameters associated with the communication process flow, wherein the data object is transmitted based at least in part on determining that the event is configured to be posted.

In some examples, to support determining that the event is configured to be posted, the configuration component 650 may be configured as or otherwise support a means for determining that the event corresponds to an action of the communication process flow that is enabled for posting into the communication channel in accordance with the one or more configuration parameters.

In some examples, the one or more configuration parameters include an indication of a channel name of the communication channel.

In some examples, the one or more configuration parameters indicate whether a create event, an update event, or a delete event associated with a plurality of action types of the communication process flow are configured to be posted into the communication channel.

In some examples, the one or more configuration parameters indicate whether a creation event, a versioned event, a draft created event, a paused event, a resumed event, a started event, or a stopped event associated with the communication process flow are configured to be posted in the communication channel.

In some examples, to support detecting the event, the object selection component 660 may be configured as or otherwise support a means for detecting, from a user, an indication of selection of a communication process flow object associated with the communication process flow, wherein the request is transmitted based at least in part on detecting the indication of selection of the communication process flow object.

In some examples, the communication process flow object is an email object, an action object, a content object, or a combination thereof.

In some examples, to support detecting the event, the object sharing component 665 may be configured as or otherwise support a means for receiving, at the communication process flow management service, an indication to share a communication process flow object associated with the communication process flow to the communication platform, wherein the request is transmitted based at least in part on detecting the indication to share.

In some examples, to support receiving the indication to share, the UI component 655 may be configured as or otherwise support a means for receiving an indication of activation of a user interface (UI) component displayed in association with the communication process flow object.

In some examples, the UI component 655 may be configured as or otherwise support a means for causing, based at least in part on detecting the event, display of a prompt associated with the communication platform, wherein the request is transmitted based at least in part on causing display of the prompt.

In some examples, the UI component 655 may be configured as or otherwise support a means for receiving, at the prompt, an indication of the communication channel of the communication platform, wherein the request is transmitted to cause posting of the entry into the communication channel of the communication platform based at least in part on receiving the indication of the communication channel.

In some examples, the request interface 635 may be configured as or otherwise support a means for receiving, in response to transmitting the request, a request for additional metadata associated with the event. In some examples, the data object generation component 630 may be configured as or otherwise support a means for generating, in response to receiving the request for the additional metadata, a second data object including the additional metadata. In some examples, the request interface 635 may be configured as or otherwise support a means for transmitting, from the communication process flow management service and to the communication platform, a second request that includes the second data object, wherein the request is configured cause a user interface including an indication of the additional metadata to be displayed in the communication platform.

Figure 7:
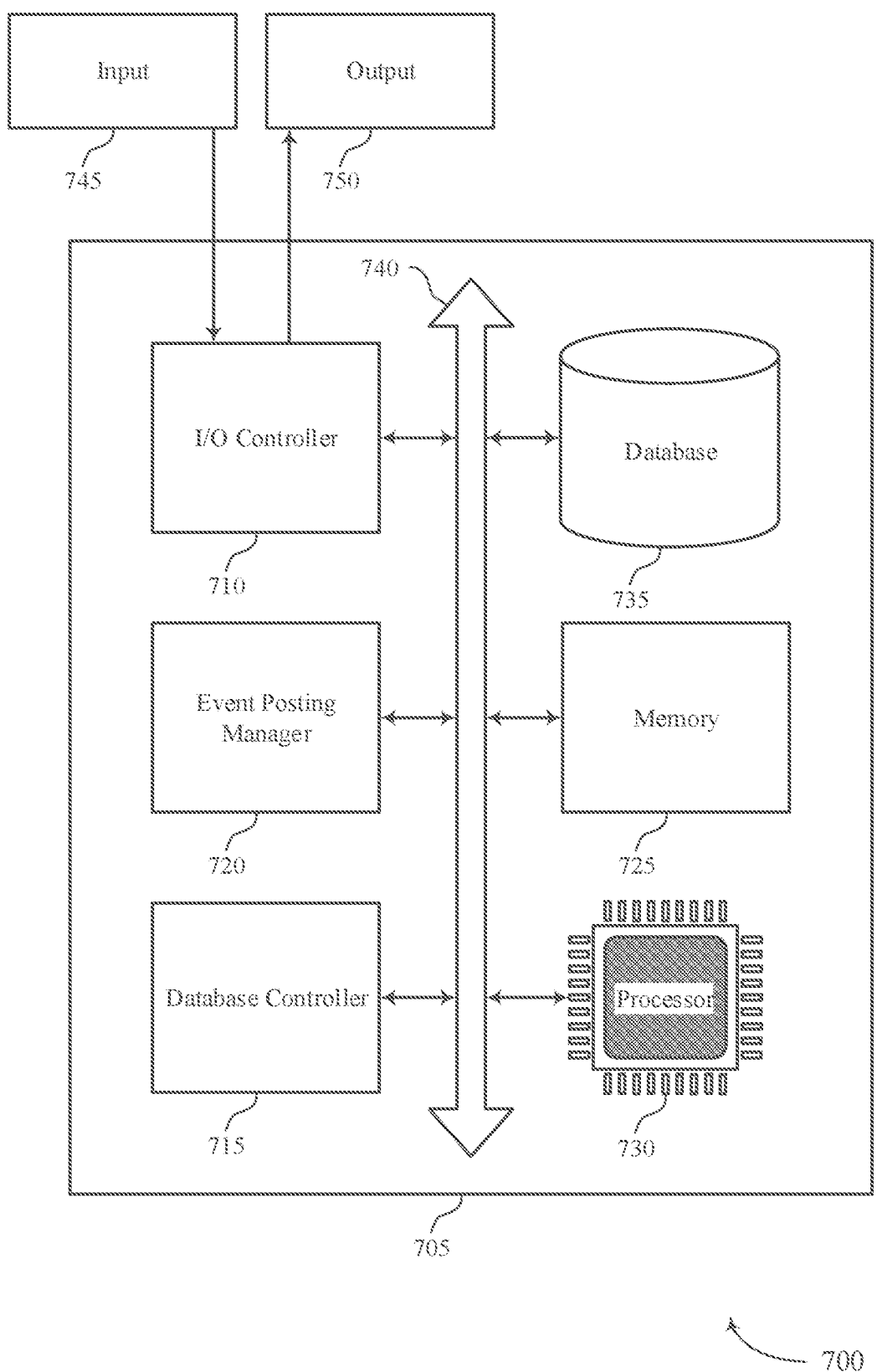
FIG. 7 shows a diagram of a system including a device that supports techniques for cross-platform communication process flow object posting in accordance with aspects of the present disclosure.

FIG. 7 shows a diagram of a system 700 including a device 705 that supports techniques for cross-platform communication process flow object posting in accordance with aspects of the present disclosure. The device 705 may be an example of or include the components of a device 505 as described herein. The device 705 may include components for bi-directional data communications including components for transmitting and receiving communications, such as an object posting manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for cross-platform communication process flow object posting).

The object posting manager 720 may support data processing in accordance with examples as disclosed herein. For example, the object posting manager 720 may be configured as or otherwise support a means for detecting an event associated with a communication process flow that controls electronic communications between a tenant of a multitenant system and a set of users corresponding to the tenant. The object posting manager 720 may be configured as or otherwise support a means for generating, based at least in part on detecting the event, a data object corresponding to the event and that includes metadata associated with the event. The object posting manager 720 may be configured as or otherwise support a means for transmitting, from a communication process flow management service and to a communication platform, a request that includes the data object, wherein the request is configured to cause posting of an entry associated with the event into a communication channel of the communication platform that is associated with the tenant.

Figure 8:
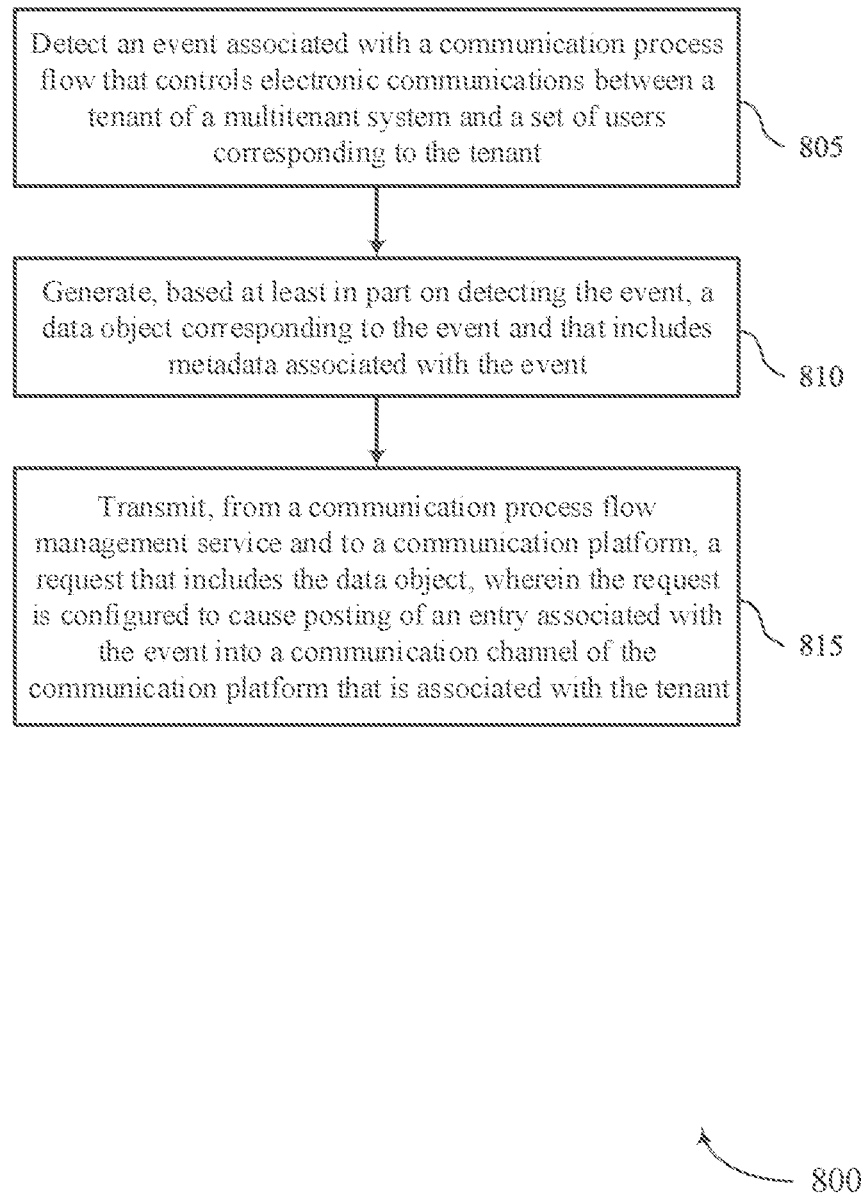
FIGS. 8 through 12 show flowcharts illustrating methods that support techniques for cross-platform communication process flow object posting in accordance with aspects of the present disclosure.

FIG. 8 shows a flowchart illustrating a method 800 that supports techniques for cross-platform communication process flow object posting in accordance with aspects of the present disclosure. The operations of the method 800 may be implemented by a server or its components as described herein. For example, the operations of the method 800 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 805, the method may include detecting an event associated with a communication process flow that controls electronic communications between a tenant of a multitenant system and a set of users corresponding to the tenant. The operations of 805 may be performed in accordance with examples as disclosed herein. In some examples, aspects of the operations of 805 may be performed by an event detection component 625 as described with reference to FIG. 6.

At 810, the method may include generating, based at least in part on detecting the event, a data object corresponding to the event and that includes metadata associated with the event. The operations of 810 may be performed in accordance with examples as disclosed herein. In some examples, aspects of the operations of 810 may be performed by a data object generation component 630 as described with reference to FIG. 6.

At 815, the method may include transmitting, from a communication process flow management service and to a communication platform, a request that includes the data object, wherein the request is configured to cause posting of an entry associated with the event into a communication channel of the communication platform that is associated with the tenant. The operations of 815 may be performed in accordance with examples as disclosed herein. In some examples, aspects of the operations of 815 may be performed by a request interface 635 as described with reference to FIG. 6.

Figure 9:
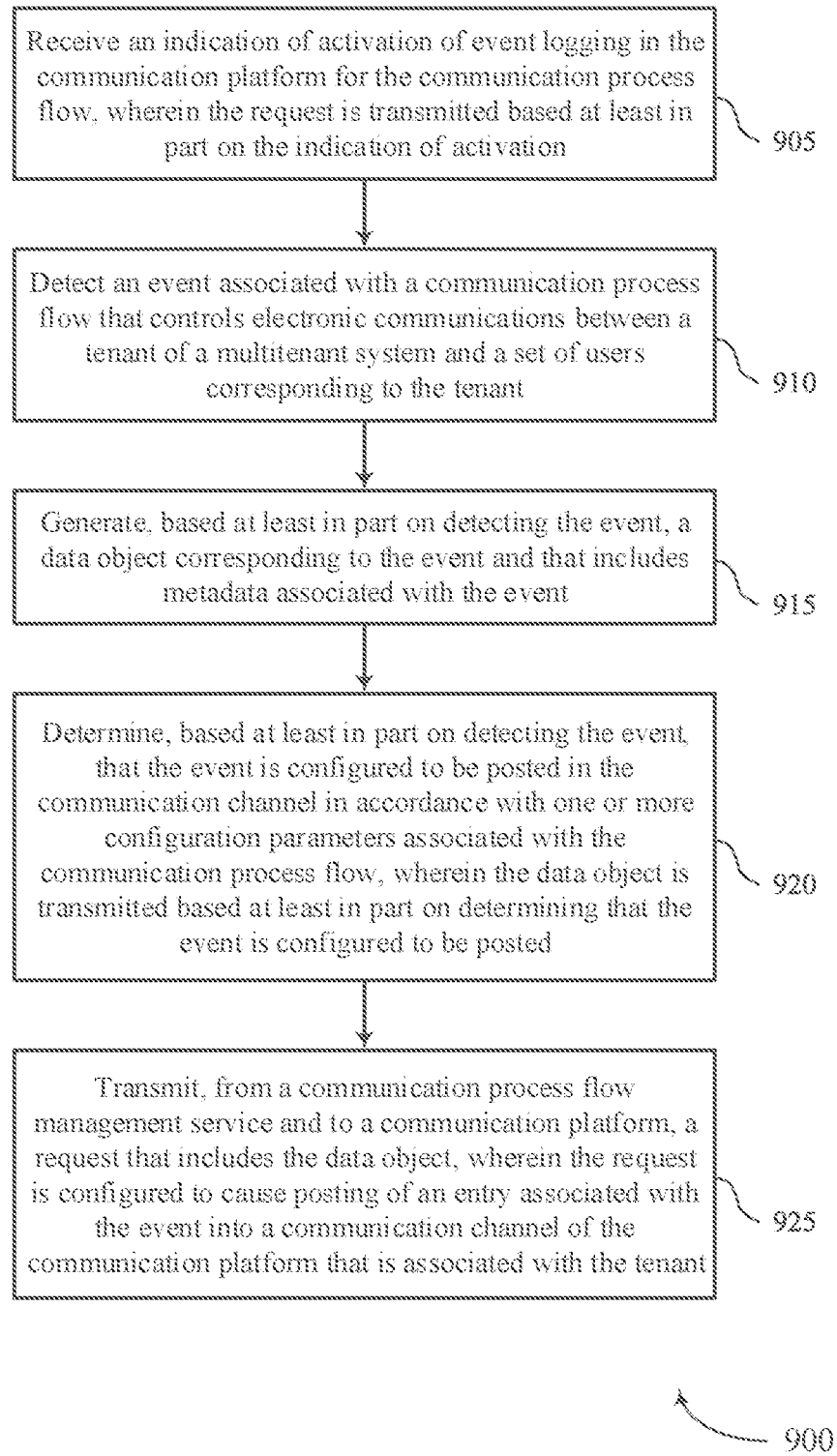

FIG. 9 shows a flowchart illustrating a method 900 that supports techniques for cross-platform communication process flow object posting in accordance with aspects of the present disclosure. The operations of the method 900 may be implemented by a server or its components as described herein. For example, the operations of the method 900 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 905, the method may include receiving an indication of activation of event logging in the communication platform for the communication process flow, wherein the request is transmitted based at least in part on the indication of activation. The operations of 905 may be performed in accordance with examples as disclosed herein. In some examples, aspects of the operations of 905 may be performed by an activation component 640 as described with reference to FIG. 6.

At 910, the method may include detecting an event associated with a communication process flow that controls electronic communications between a tenant of a multitenant system and a set of users corresponding to the tenant. The operations of 910 may be performed in accordance with examples as disclosed herein. In some examples, aspects of the operations of 910 may be performed by an event detection component 625 as described with reference to FIG. 6.

At 915, the method may include generating, based at least in part on detecting the event, a data object corresponding to the event and that includes metadata associated with the event. The operations of 915 may be performed in accordance with examples as disclosed herein. In some examples, aspects of the operations of 915 may be performed by a data object generation component 630 as described with reference to FIG. 6.

At 920, the method may include determining, based at least in part on detecting the event, that the event is configured to be posted in the communication channel in accordance with one or more configuration parameters associated with the communication process flow, wherein the data object is transmitted based at least in part on determining that the event is configured to be posted. The operations of 920 may be performed in accordance with examples as disclosed herein. In some examples, aspects of the operations of 920 may be performed by a configuration component 650 as described with reference to FIG. 6.

At 925, the method may include transmitting, from a communication process flow management service and to a communication platform, a request that includes the data object, wherein the request is configured to cause posting of an entry associated with the event into a communication channel of the communication platform that is associated with the tenant. The operations of 925 may be performed in accordance with examples as disclosed herein. In some examples, aspects of the operations of 925 may be performed by a request interface 635 as described with reference to FIG. 6.

Figure 10:
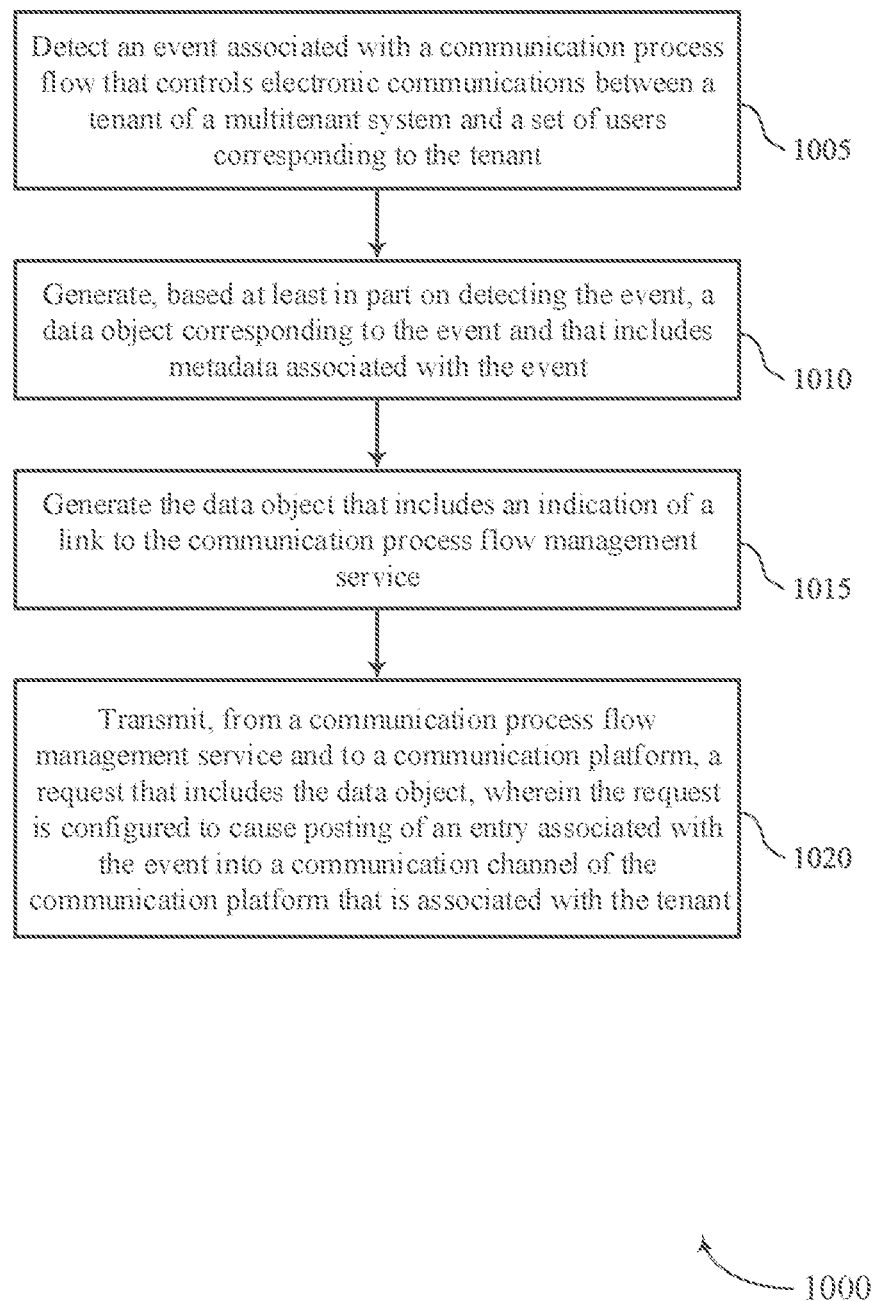

FIG. 10 shows a flowchart illustrating a method 1000 that supports techniques for cross-platform communication process flow object posting in accordance with aspects of the present disclosure. The operations of the method 1000 may be implemented by a server or its components as described herein. For example, the operations of the method 1000 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1005, the method may include detecting an event associated with a communication process flow that controls electronic communications between a tenant of a multitenant system and a set of users corresponding to the tenant. The operations of 1005 may be performed in accordance with examples as disclosed herein. In some examples, aspects of the operations of 1005 may be performed by an event detection component 625 as described with reference to FIG. 6.

At 1010, the method may include generating, based at least in part on detecting the event, a data object corresponding to the event and that includes metadata associated with the event. The operations of 1010 may be performed in accordance with examples as disclosed herein. In some examples, aspects of the operations of 1010 may be performed by a data object generation component 630 as described with reference to FIG. 6.

At 1015, the method may include generating the data object that includes an indication of a link to the communication process flow management service. The operations of 1015 may be performed in accordance with examples as disclosed herein. In some examples, aspects of the operations of 1015 may be performed by a data object generation component 630 as described with reference to FIG. 6.

At 1020, the method may include transmitting, from a communication process flow management service and to a communication platform, a request that includes the data object, wherein the request is configured to cause posting of an entry associated with the event into a communication channel of the communication platform that is associated with the tenant. The operations of 1020 may be performed in accordance with examples as disclosed herein. In some examples, aspects of the operations of 1020 may be performed by a request interface 635 as described with reference to FIG. 6.

Figure 11:
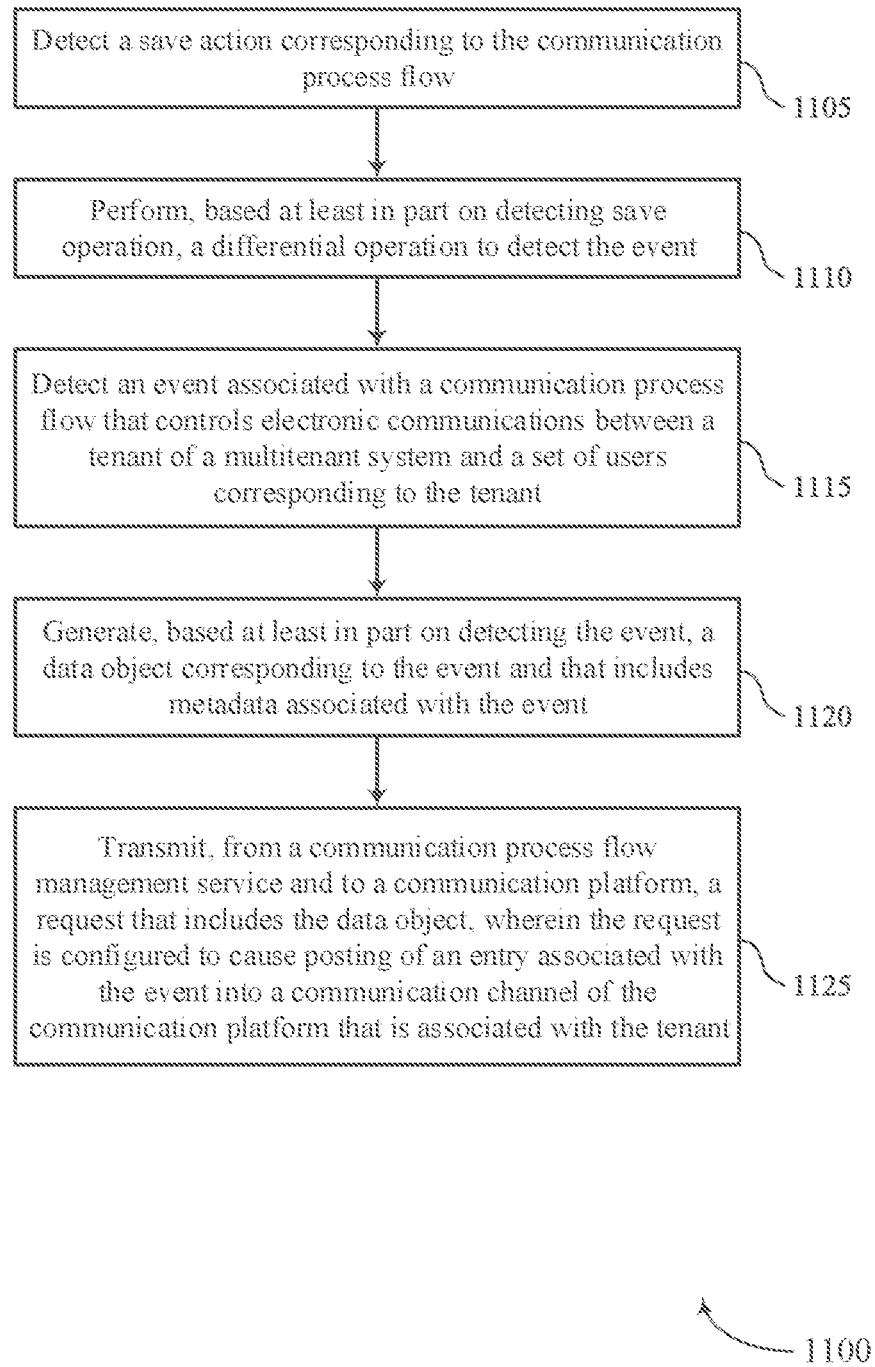

FIG. 11 shows a flowchart illustrating a method 1100 that supports techniques for cross-platform communication process flow object posting in accordance with aspects of the present disclosure. The operations of the method 1100 may be implemented by a server or its components as described herein. For example, the operations of the method 1100 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1105, the method may include detecting a save action corresponding to the communication process flow. The operations of 1105 may be performed in accordance with examples as disclosed herein. In some examples, aspects of the operations of 1105 may be performed by a save detection component 645 as described with reference to FIG. 6.

At 1110, the method may include performing, based at least in part on detecting save operation, a differential operation to detect the event. The operations of 1110 may be performed in accordance with examples as disclosed herein. In some examples, aspects of the operations of 1110 may be performed by an event detection component 625 as described with reference to FIG. 6.

At 1115, the method may include detecting an event associated with a communication process flow that controls electronic communications between a tenant of a multitenant system and a set of users corresponding to the tenant. The operations of 1115 may be performed in accordance with examples as disclosed herein. In some examples, aspects of the operations of 1115 may be performed by an event detection component 625 as described with reference to FIG. 6.

At 1120, the method may include generating, based at least in part on detecting the event, a data object corresponding to the event and that includes metadata associated with the event. The operations of 1120 may be performed in accordance with examples as disclosed herein. In some examples, aspects of the operations of 1120 may be performed by a data object generation component 630 as described with reference to FIG. 6.

At 1125, the method may include transmitting, from a communication process flow management service and to a communication platform, a request that includes the data object, wherein the request is configured to cause posting of an entry associated with the event into a communication channel of the communication platform that is associated with the tenant. The operations of 1125 may be performed in accordance with examples as disclosed herein. In some examples, aspects of the operations of 1125 may be performed by a request interface 635 as described with reference to FIG. 6.

Figure 12:
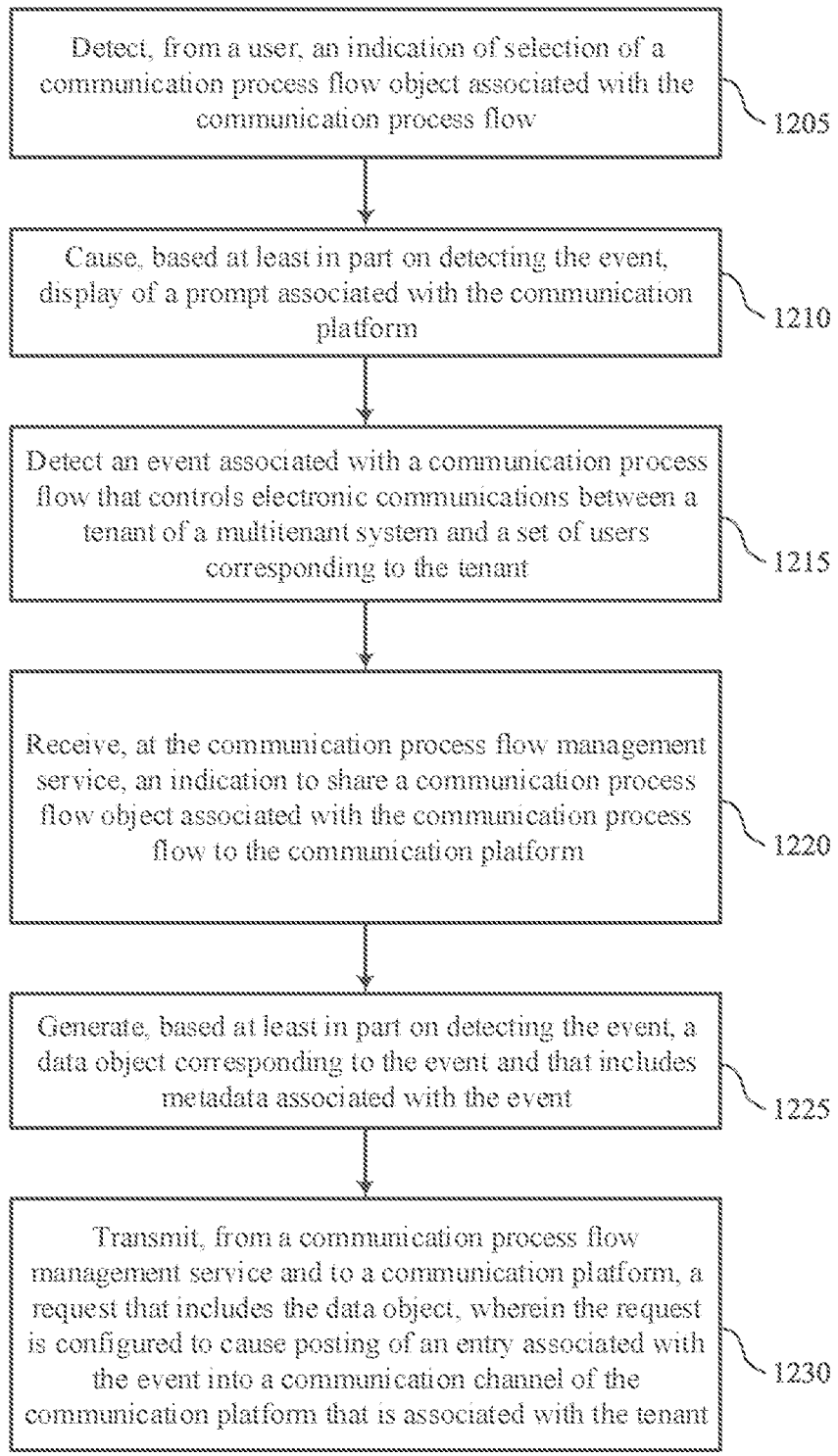

FIG. 12 shows a flowchart illustrating a method 1200 that supports techniques for cross-platform communication process flow object posting in accordance with aspects of the present disclosure. The operations of the method 1200 may be implemented by a server or its components as described herein. For example, the operations of the method 1200 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1205, the method may include detecting, from a user, an indication of selection of a communication process flow object associated with the communication process flow. The operations of 1205 may be performed in accordance with examples as disclosed herein. In some examples, aspects of the operations of 1205 may be performed by an object selection component 660 as described with reference to FIG. 6.

At 1210, the method may include causing, based at least in part on detecting the event, display of a prompt associated with the communication platform. The operations of 1210 may be performed in accordance with examples as disclosed herein. In some examples, aspects of the operations of 1210 may be performed by a UI component 655 as described with reference to FIG. 6.

At 1215, the method may include detecting an event associated with a communication process flow that controls electronic communications between a tenant of a multitenant system and a set of users corresponding to the tenant. The operations of 1215 may be performed in accordance with examples as disclosed herein. In some examples, aspects of the operations of 1215 may be performed by an event detection component 625 as described with reference to FIG. 6.

At 1220, the method may include receiving, at the communication process flow management service, an indication to share a communication process flow object associated with the communication process flow to the communication platform. The operations of 1220 may be performed in accordance with examples as disclosed herein. In some examples, aspects of the operations of 1220 may be performed by an object sharing component 665 as described with reference to FIG. 6.

At 1225, the method may include generating, based at least in part on detecting the event, a data object corresponding to the event and that includes metadata associated with the event. The operations of 1225 may be performed in accordance with examples as disclosed herein. In some examples, aspects of the operations of 1225 may be performed by a data object generation component 630 as described with reference to FIG. 6.

At 1230, the method may include transmitting, from a communication process flow management service and to a communication platform, a request that includes the data object, wherein the request is configured to cause posting of an entry associated with the event into a communication channel of the communication platform that is associated with the tenant. The request may be transmitted based on detecting selection of the communication process flow object, based on display of the prompt, based on receiving the indication to share, or a combination thereof. The operations of 1230 may be performed in accordance with examples as disclosed herein. In some examples, aspects of the operations of 1230 may be performed by a request interface 635 as described with reference to FIG. 6.

A method for data processing is described. The method may include detecting an event associated with a communication process flow that controls electronic communications between a tenant of a multitenant system and a set of users corresponding to the tenant, generating, based at least in part on detecting the event, a data object corresponding to the event and that includes metadata associated with the event, and transmitting, from a communication process flow management service and to a communication platform, a request that includes the data object, wherein the request is configured to cause posting of an entry associated with the event into a communication channel of the communication platform that is associated with the tenant.

An apparatus for data processing is described. The apparatus may include a processor, memory coupled with the processor, and instructions stored in the memory. The instructions may be executable by the processor to cause the apparatus to detect an event associated with a communication process flow that controls electronic communications between a tenant of a multitenant system and a set of users corresponding to the tenant, generate, based at least in part on detecting the event, a data object corresponding to the event and that includes metadata associated with the event, and transmit, from a communication process flow management service and to a communication platform, a request that includes the data object, wherein the request is configured to cause posting of an entry associated with the event into a communication channel of the communication platform that is associated with the tenant.

Another apparatus for data processing is described. The apparatus may include means for detecting an event associated with a communication process flow that controls electronic communications between a tenant of a multitenant system and a set of users corresponding to the tenant, means for generating, based at least in part on detecting the event, a data object corresponding to the event and that includes metadata associated with the event, and means for transmitting, from a communication process flow management service and to a communication platform, a request that includes the data object, wherein the request is configured to cause posting of an entry associated with the event into a communication channel of the communication platform that is associated with the tenant.

A non-transitory computer-readable medium storing code for data processing is described. The code may include instructions executable by a processor to detect an event associated with a communication process flow that controls electronic communications between a tenant of a multitenant system and a set of users corresponding to the tenant, generate, based at least in part on detecting the event, a data object corresponding to the event and that includes metadata associated with the event, and transmit, from a communication process flow management service and to a communication platform, a request that includes the data object, wherein the request is configured to cause posting of an entry associated with the event into a communication channel of the communication platform that is associated with the tenant.

Some examples of the method, apparatuses, and non-transitory computer-readable medium described herein may further include operations, features, means, or instructions for receiving an indication of activation of event logging in the communication platform for the communication process flow, wherein the request may be transmitted based at least in part on the indication of activation.

In some examples of the method, apparatuses, and non-transitory computer-readable medium described herein, receiving the indication may include operations, features, means, or instructions for receiving the indication of a uniform resource locator for a webhook associated with the communication channel, a workspace in the communication platform, or a combination thereof.

Some examples of the method, apparatuses, and non-transitory computer-readable medium described herein may further include operations, features, means, or instructions for activating an authentication flow for the communication platform and receiving an indication of a uniform resource locator for a webhook that may be associated with the communication channel, a workspace in the communication platform, or a combination thereof via the authentication flow.

In some examples of the method, apparatuses, and non-transitory computer-readable medium described herein, generating the data object may include operations, features, means, or instructions for generating a JavaScript object notation (JSON) object that may be ingestible by the communication platform for posting the entry associated with the event into the communication channel.

In some examples of the method, apparatuses, and non-transitory computer-readable medium described herein, the JSON object includes attribute value pairs corresponding to the metadata associated with the event.

In some examples of the method, apparatuses, and non-transitory computer-readable medium described herein, generating the data object may include operations, features, means, or instructions for generating the data object that includes an indication of a link to the communication process flow management service.

Some examples of the method, apparatuses, and non-transitory computer-readable medium described herein may further include operations, features, means, or instructions for receiving, at the communication process flow management service and from the communication platform in response to transmitting the data object, a second request to view a user interface associated with the occurrence of the anomaly and displaying, based at least in part on receiving the second request, the user interface associated with the detected event.

Some examples of the method, apparatuses, and non-transitory computer-readable medium described herein may further include operations, features, means, or instructions for detecting a save action corresponding to the communication process flow and performing, based at least in part on detecting save operation, a differential operation to detect the event.

Some examples of the method, apparatuses, and non-transitory computer-readable medium described herein may further include operations, features, means, or instructions for determining, based at least in part on detecting the event, that the event may be configured to be posted in the communication channel in accordance with one or more configuration parameters associated with the communication process flow, wherein the data object may be transmitted based at least in part on determining that the event may be configured to be posted.

In some examples of the method, apparatuses, and non-transitory computer-readable medium described herein, determining that the event may be configured to be posted may include operations, features, means, or instructions for determining that the event corresponds to an action of the communication process flow that may be enabled for posting into the communication channel in accordance with the one or more configuration parameters.

In some examples of the method, apparatuses, and non-transitory computer-readable medium described herein, the one or more configuration parameters include an indication of a channel name of the communication channel.

In some examples of the method, apparatuses, and non-transitory computer-readable medium described herein, the one or more configuration parameters indicate whether a create event, an update event, or a delete event associated with a plurality of action types of the communication process flow may be configured to be posted into the communication channel.

In some examples of the method, apparatuses, and non-transitory computer-readable medium described herein, the one or more configuration parameters indicate whether a creation event, a versioned event, a draft created event, a paused event, a resumed event, a started event, or a stopped event associated with the communication process flow may be configured to be posted in the communication channel.

Some examples of the method, apparatuses, and non-transitory computer-readable medium described herein may further include operations, features, means, or instructions for receiving, in response to transmitting the request, a request for additional metadata associated with the event, generating, in response to receiving the request for the additional metadata, a second data object including the additional metadata, and transmitting, from the communication process flow management service and to the communication platform, a second request that includes the second data object, wherein the request may be configured cause a user interface including an indication of the additional metadata to be displayed in the communication platform.

In some examples of the method, apparatuses, and non-transitory computer-readable medium described herein, detecting the event may include operations, features, means, or instructions for detecting, from a user, an indication of selection of a communication process flow object associated with the communication process flow, wherein the request may be transmitted based at least in part on detecting the indication of selection of the communication process flow object.

In some examples of the method, apparatuses, and non-transitory computer-readable medium described herein, the communication process flow object may be an email object, an action object, a content object, or a combination thereof.

In some examples of the method, apparatuses, and non-transitory computer-readable medium described herein, detecting the event may include operations, features, means, or instructions for receiving, at the communication process flow management service, an indication to share a communication process flow object associated with the communication process flow to the communication platform, wherein the request may be transmitted based at least in part on detecting the indication to share.

In some examples of the method, apparatuses, and non-transitory computer-readable medium described herein, receiving the indication to share may include operations, features, means, or instructions for receiving an indication of activation of a user interface (UI) component displayed in association with the communication process flow object.

Some examples of the method, apparatuses, and non-transitory computer-readable medium described herein may further include operations, features, means, or instructions for causing, based at least in part on detecting the event, display of a prompt associated with the communication platform, wherein the request may be transmitted based at least in part on causing display of the prompt.

Some examples of the method, apparatuses, and non-transitory computer-readable medium described herein may further include operations, features, means, or instructions for receiving, at the prompt, an indication of the communication channel of the communication platform, wherein the request may be transmitted to cause posting of the entry into the communication channel of the communication platform based at least in part on receiving the indication of the communication channel.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
    detecting, via a user interface, a user action corresponding to a communication process flow object associated with a communication process flow that controls electronic communications between an organization and a set of users corresponding to the organization;
    generating, based at least in part on detecting the user action, a data object and that includes metadata associated with the communication process flow object; and
    transmitting, from a communication process flow management service and to a communication platform, a request that includes the data object and a channel identifier associated with a communication channel of the communication platform, the communication channel being a chat room between one or more users of the organization for communications associated with the communication process flow and the channel identifier being associated with the chat room, wherein the request being configured to cause posting of the data object into the communication channel of the communication platform that is associated with the organization, and wherein the request is transmitted based at least in part on detecting the user action.

2. The method of claim 1, wherein detecting the user action via the user interface comprises:
detecting, from the user action via the user interface, an indication of selection of the communication process flow object associated with the communication process flow, wherein the request is transmitted based at least in part on detecting the indication of the selection of the communication process flow object.

3. The method of claim 2, wherein the communication process flow object is an email object, an action object, a content object, or a combination thereof.

4. The method of claim 1, wherein detecting the user action via the user interface comprises:
receiving, at the communication process flow management service, an indication to share the communication process flow object associated with the communication process flow to the communication platform, wherein the request is transmitted based at least in part on detecting the indication to share from the user action via the user interface.

5. The method of claim 4, wherein receiving the indication to share comprises:
receiving an indication of activation of a user interface component displayed in association with the communication process flow object, wherein the user interface is associated with the user interface component.

6. The method of claim 1, further comprising:
causing, based at least in part on detecting the user action corresponding to the communication process flow object associated with the communication process flow, display of a prompt associated with the communication platform, wherein the request is transmitted based at least in part on causing display of the prompt.

7. The method of claim 6, further comprising:
receiving, at the prompt, an indication of the communication channel of the communication platform, wherein the request is transmitted to cause posting of the data object into the communication channel of the communication platform based at least in part on receiving the indication of the communication channel.

8. The method of claim 1, wherein generating the data object comprises:
generating a JavaScript object notation (JSON) object that is ingestible by the communication platform for posting the data object into the communication channel.

9. The method of claim 1, wherein generating the data object comprises:
generating the data object that includes an indication of a link to the communication process flow management service.

10. The method of claim 1, further comprising:
receiving, in response to transmitting the request, a request for additional metadata associated with the communication process flow object;
generating, in response to receiving the request for the additional metadata, a second data object including the additional metadata; and
transmitting, from the communication process flow management service and to the communication platform, a second request that includes the second data object, wherein the request is configured cause the user interface including an indication of the additional metadata to be displayed in the communication platform.

11. An apparatus for data processing, comprising:
one or more processors;
one or more memories coupled with the one or more processors; and
instructions stored in the one or more memories and executable by the one or more processors to cause the apparatus to:
detect, via a user interface a user action corresponding to a communication process flow object associated with a communication process flow that controls electronic communications between an organization and a set of users corresponding to the organization;
generate, based at least in part on detecting the user action, a data object that includes metadata associated with the communication process flow object; and
transmit, from a communication process flow management service and to a communication platform, a request that includes the data object and a channel identifier associated with a communication channel of the communication platform, the communication channel being a chat room between one or more users of the organization for communications associated with the communication process flow and the channel identifier being associated with the chat room, wherein the request being configured to cause posting of the data object into the communication channel of the communication platform that is associated with the organization, and wherein the request is transmitted based at least in part on detecting the user action.

12. The apparatus of claim 11, wherein the instructions to detect the user action via the user interface are executable by the one or more processors to cause the apparatus to:
detect, from the user action via the user interface, an indication of selection of the communication process flow object associated with the communication process flow, wherein the request is transmitted based at least in part on detecting the indication of the selection of the communication process flow object via the user action via the user interface.

13. The apparatus of claim 12, wherein the communication process flow object is an email object, an action object, a content object, or a combination thereof.

14. The apparatus of claim 11, wherein the instructions to detect the user action via the user interface are executable by the one or more processors to cause the apparatus to:
receive, at the communication process flow management service, an indication to share the communication process flow object associated with the communication process flow to the communication platform, wherein the request is transmitted based at least in part on detecting the indication to share from the user action via the user interface.

15. The apparatus of claim 14, wherein the instructions to receive the indication to share are executable by the one or more processors to cause the apparatus to:
receive an indication of activation of a user interface component displayed in association with the communication process flow object, wherein the user interface is associated with the user interface component.

16. A non-transitory computer-readable medium storing code for data processing, the code comprising instructions executable by one or more processors to:
detect, via a user interface, a user action corresponding to a communication process flow object associated with a communication process flow that controls electronic communications between an organization and a set of users corresponding to the organization;

generate, based at least in part on detecting the user action, a data object and that includes metadata associated with the communication process flow object; and transmit, from a communication process flow management service and to a communication platform, a request that includes the data object and a channel identifier associated with a communication channel of the communication platform, the communication channel being a chat room between one or more users of the organization for communications associated with the communication process flow and the channel identifier being associated with the chat room, wherein the request being configured to cause posting of the data object into the communication channel of the communication platform that is associated with the organization, and wherein the request is transmitted based at least in part on detecting the user action.

17. The non-transitory computer-readable medium of claim 16, wherein the instructions to detect the user action via the user interface are executable by the one or more processors to:

detect, from the user action via the user interface, an indication of selection of the communication process flow object associated with the communication process flow, wherein the request is transmitted based at least in part on detecting the indication of the selection of the communication process flow object.

18. The non-transitory computer-readable medium of claim 17, wherein the communication process flow object is an email object, an action object, a content object, or a combination thereof.

19. The non-transitory computer-readable medium of claim 16, wherein the instructions to detect the user action via the user interface are executable by the one or more processors to:

receive, at the communication process flow management service, an indication to share the communication process flow object associated with the communication process flow to the communication platform, wherein the request is transmitted based at least in part on detecting the indication to share from the user action via the user interface.

20. The non-transitory computer-readable medium of claim 19, wherein the instructions to receive the indication to share are executable by the one or more processors to:

receive an indication of activation of a user interface component displayed in association with the communication process flow object, wherein the user interface is associated with the user interface component.

\* \* \* \* \*